United States Patent

Ohtani

[11] 4,212,279
[45] Jul. 15, 1980

[54] ELECTRONIC-MECHANICAL GOVERNOR FOR DIESEL ENGINES

[75] Inventor: Yoshio Ohtani, Higashi-Matsuyama, Japan

[73] Assignee: Diesel Kiki Co., Ltd., Tokyo, Japan

[21] Appl. No.: 923,498

[22] Filed: Jul. 11, 1978

[30] Foreign Application Priority Data

Jul. 15, 1977 [JP] Japan .................................. 52-84043

[51] Int. Cl.³ .......................................... F02M 59/20
[52] U.S. Cl. ..................................... 123/352; 123/365
[58] Field of Search ............ 123/102, 140 MC, 139 E, 123/140 R

[56] References Cited

U.S. PATENT DOCUMENTS

| | | | |
|---|---|---|---|
| 2,708,921 | 5/1955 | Links | 123/140 R |
| 3,082,353 | 3/1963 | Cohen et al. | 123/102 X |
| 3,718,123 | 2/1973 | Eckert et al. | 123/139 E X |
| 3,750,633 | 8/1973 | Ohtani et al. | 123/102 |
| 3,750,635 | 8/1973 | Hoffman et al. | 123/140 MC |
| 3,886,921 | 6/1975 | Hafner | 123/102 X |

FOREIGN PATENT DOCUMENTS 43-22482  9/1968  Japan .

*Primary Examiner*—Tony M. Argenbright
*Attorney, Agent, or Firm*—Frishauf, Holtz, Goodman & Woodward

[57] ABSTRACT

A governor for use in a diesel engine which comprises an integral combination of a centrifugal governing mechanism mainly constituted of a flyweight unit connected to the driving shaft of the diesel engine and an electronic governing mechanism mainly constituted of an electromagnetic actuator including an electromagnetic coil and a plunger connected to a fuel control rack. In said electronic governing mechanism, the plunger is connected to the fuel control rack via a coupling means with a built-in Angleichung spring for adjusting the rate of fuel supply to a proper value in response to a change in the engine speed, while at high engine speeds said centrifugal governing mechanism is adapted for connection to said fuel control rack via a lever-rod coupling means to transmit the opening motion of the flyweight unit via said lever-rod coupling means to the fuel control rack thereby to move the fuel control rack in the fuel supply-decreasing direction.

8 Claims, 4 Drawing Figures

ELECTRONIC-MECHANICAL GOVERNOR FOR DIESEL ENGINES

BACKGROUND OF THE INVENTION

This invention relates to a governor for diesel engines, and more particularly to an electronic-mechanical governor adapted for use in a high-speed diesel engine for vehicles, which controls the engine speed by means of an electromagnetic actuator at low engine speeds and by means of a mechanical means utilizing a centrifugal force at high engine speeds.

The diesel engines for vehicles conventionally used mainly include mechanical governors which utilize the centrifugal force of flyweights and pneumatic governors which employ a diaphram. However, these conventional types of governors have the disadvantages that in the former type of governors the engine suffers hunting due to insufficient control of the engine speed at low speeds if the flyweights are designed small in size so as to comply with the spacewise limitation, while the latter type of governors are low in response to changes in the negative pressure in the intake pipe in the range of low engine speeds where the throttle valve of the venturi tube opens. On the other hand, in the diesel engines for vehicles, a governor which is capable of performing the control of the engine speed over a wide range of engine speeds in a stable manner has been desired in order to cope with the recent increased maximum speed of automobiles. In view of the above situations, in order to avoid the drawbacks in the both conventional governors and to exhibit the merits thereof, a governor has been proposed which comprises a combination of the two types of governors mentioned above in which the engine speed control is effected by means of the pneumatic governing mechanism utilizing the negative pressure in the intake pipe of the engine at low engine speeds, and by means of the mechanical governing mechanism utilizing the centrifugal force of the flyweights at high engine speeds. For instance, according to Japanese Utility Model Publication No. 22482/68, a governor for internal combustion engines of a fuel-injecting type which comprises a housing partitioned in two chambers by a partition wall; a pneumatic governing mechanism and a centrifugal or mechanical governing mechanism provided in respective ones of said chambers, the former mechanism having a diaphram connected to the fuel control rack of the fuel-injection pump and the latter mechanism having a shifter connected to a coupling means including two levers mounted in respective ones of said chambers and a push rod mounted in a fashion extending through said partition wall for transmitting the opening motion of the flyweights to the fuel control rack via said coupling means to move the fuel control rack in the fuel supply-decreasing direction, whereby the maximum engine speed is governed by the centrifugal or mechanical governor mechanism whereas the other ranges of engine speeds are governed by the pneumatic governor mechanism.

However, this type of governor has the following drawbacks and particularly it can difficultly cope with the recent exhaust-gas control;

(1) Since the amount of intake air charged into the engine is restrained by the venturi tube which is mounted in the intake pipe of the engine for control of the negative pressure in the intake pipe to actuate the pneumatic governor mechanism, the combustion efficiency of the engine is low, causing emission of smoke.

(2) If the exhaust gas recycle system (EGR) is employed in the engine for purification of the exhaust has, there occur irregular changes in the negative pressure in the interior of the venturi tube, which makes it difficult to ensure the regular operation of the pneumatic governing mechanism, thus impairing the controllability of the engine speed.

(3) In high places such as mountain districts where the atmospheric pressure varies largely and frequently, regular control of the engine speed cannot be performed by the pneumatic governing mechanism.

The present invention has been made in order to overcome the above-mentioned drawbacks in the conventional pneumatic-mechanical governor, and it is a primary object of the invention to provide an electronic-mechanical governor primarily adapted for use in a high-speed diesel engine for vehicles, which comprises a combination of an electronic governing mechanism and a mechanical governing mechanism and can perform stable and accurate control of the entire range of engine speeds in such a manner that the engine speed is controlled by the mechanical governing mechanism in the high-speed range and by the electronic governing mechanism in the low-speed range.

It is a further object of the invention to provide an electronic-mechanical governor which can exhibit an accurate and stable governing function over the entire range of engine speeds from the low-speed range to the high-speed range even if installed in an engine provided with exhaust gas purification measures such as the exhaust gas recycle system.

DETAILED DESCRIPTION

Figure 1:
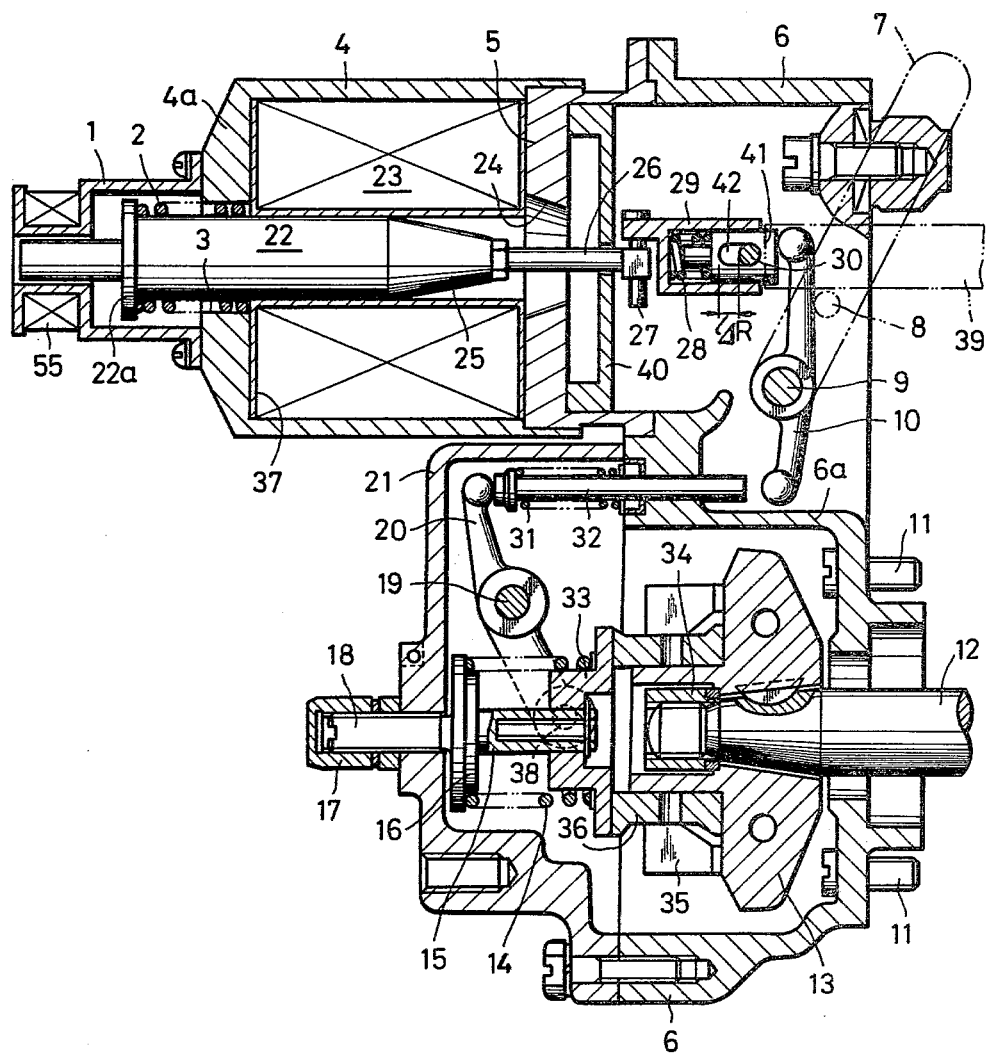
FIG. 1 is a longitudinal sectional view illustrating an electronic-mechanical governor according to the present invention.

Referring now to FIG. 1, there is shown an embodiment of the invention, in which a casing 6 is mounted on an end wall of a fuel-injection pump (not shown) by means of bolts 11. The casing 6 is partitioned in two upper and lower chambers by a partition wall 6a. A cam shaft 12 of the fuel-injection pump connected to the driving shaft of a diesel engine is provided in a fashion protruding in the interior of the lower chamber, on which shaft is fitted a flange 13 which is secured to the shaft by a nut 34. Said flange 13 carries a pair of flyweights 35 as conventionally known, a radially outward or opening motion of which causes a sleeve 36 engaging with the flyweights 35 to be moved leftward along the cam shaft 12, as viewed in FIG. 1. Secured to a left end of the sleeve 36 is a spring seat 33 which cooperates with said sleeve 36 to constitute a shifter. The spring seat 33 carries a sliding element 15 slidably inserted therein. Another spring seat 16 is threadedly fitted in a cover 21 which closes an open left end of the casing 6.

Interposed between said two seats 33 and 16 is a compression spring 14 for urging said shifter against the centrifugal force of the flyweights 35. The spring 14 has its force adjustable by means of a threaded portion 18 of the spring seat 16 and has its load settable to a desired value by means of a nut 17 engaging with the threaded portion 18. A connecting lever 20 is supported on the cover 21 through a fulcrum shaft 19 for pivoting about a substantially central fulcrum thereof. The connecting lever 20 has a lower end thereof bifurcated to stand astride a cylindrical portion of said spring seat 33 and tied to the same seat 33 by a pin 38.

On the other hand, the connecting lever 20 has a top end thereof urged by a push rod 32 slidably supported through the partition wall 6a due to the force of a spring 31 fitted thereon. In the interior of the upper chamber of the casing defined by the partition wall 6a, another connecting lever 10 is supported in the casing via a fulcrum shaft 9 secured to the casing 6 for pivoting about a substantially central fulcrum thereof. Said lever 10 has a lower end thereof arranged opposite to the right end of said push rod 32 and has an upper end thereof arranged in urging contact with an engaging piece 41 supported at the coupling point between an electromagnetic actuator and a fuel control rack 39 of the fuel-injection pump both of which will be referred to hereinlater. A stopping lever 7 is supported on said fulcrum shaft 9, which lever has a pin 8 secured thereto. Said connecting lever 10 which is clockwise urged by a spring (not shown) fitted on said fulcrum shaft 9 is arranged in urging contact with said pin 8.

An electromagnetic actuator is mounted at a left end portion of the upper chamber of the casing 6. This electromagnetic actuator, of which the basic structure is known per se, is basically composed of an end wall plate 5 secured to a left end portion of the casing 6 to act as a magnetic pole, a cylindrical casing 4 mounted on said end wall plate 5 in a fashion that the casing 4 has an open end thereof covered with the end wall plate 5, an electromagnetic coil 23 of a cylindrical shape received within said casing 4 via a spool 37, a through hole 3 of a circular cross-section and a through hole 24 of a conical axial section formed in the end wall 4a of said casing 4 and in said end wall plate 5 respectively, a plunger 22 slidably inserted in a hollow portion of said spool 37, and a spring 2 arranged for urging said plunger 22 in a direction opposite to the end wall plate 5. The plunger 22 has a left end thereof urged by said spring 2 interposed between a flange 22a integral with the plunger 22 and a left end face of the spool 37 to protrude outwardly of the end wall 4a through said circular through hole 3, and the thus protruding end portion of the plunger 22 is covered with a cover 1. Said plunger 22 has a right end portion 25 thereof tapered which is connected with a rod member 26 slidably supported in a guide plate 40 mounted on said end plate 5. Coupled to said rod member 26 is a hollow cylindrical piece 29 by means of a pin 27 vertically directed. Said cylindrical piece 29 has an open end directed in a direction opposite to said plunger 22. Slidably engaged in the interior of said cylindrical piece 29 through said open end thereof is the aforementioned engaging piece 41 which is adapted to be urged against the top end of the connecting lever 10 by an adaptation spring 28 also disposed within the cylindrical piece 29. Said engaging piece 41 is formed with an elongate through hole 42 transverselly extending therethrough, through which a pin 30 secured to the cylindrical piece 29 is disposed for limiting the movement of the engaging piece 41 relative to the cylindrical piece 29 within a predetermined range. The engaging piece 41 is also coupled with a fuel control rack 39 which extends from the main body of the fuel-injection pump to project in the interior of the casing 6.

The casing 6, yoke 4, end wall plate 5 and plunger 22 are made of respective magnetic materials. The clearance between the outer peripheral surface of the plunger 22 and the circular hole 3 formed in the end wall 4a is designed small, while the clearance between the tapered end portion 25 of the plunger 22 and the conical hole 24 in the end wall plate 5 is designed to have a suitable value, so that a rightward movement of the plunger 22 can cause the magnetic gap between the end portion 25 of the plunger 22 and the conical hole 24 of the end wall plate 5 forming a magnetic pole to slowly vary so as to obtain a good controllability of the engine speed.

Figure 2:
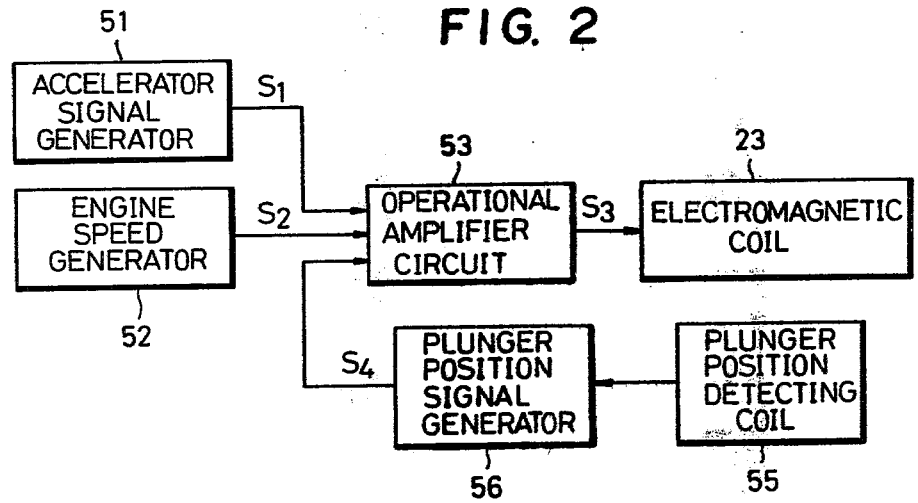
FIG. 2 is a block diagram of the electrical control circuit for the electromagnetic actuator used in the governor of FIG. 1.
Figure 3:
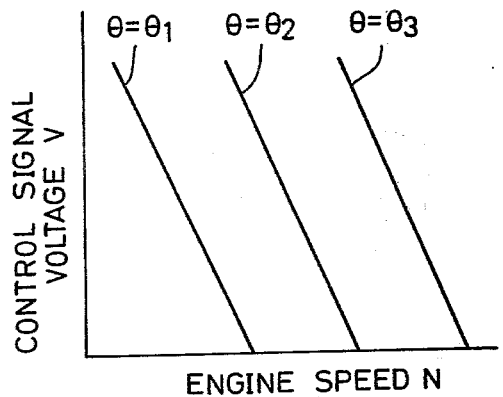
FIG. 3 is a diagram showing the relationship between the control signal voltage and the engine speed according to the control circuit of FIG. 2.

FIG. 2 illustrates a control circuit for driving the electromagnetic actuator which is composed of said electromagnetic coil 23 and plunger 22. The control circuit comprises an accelerator signal generator 51, an engine speed signal generator 52, an operational amplifier circuit 53, an electromagnetic coil 23, a coil 55 for detecting the position of the plunger 22, and a plunger position signal generator 56. The accelerator signal generator 51 generates an accelerator signal $S_1$ which is a direct current having a voltage corresponding to the amount of operation $\theta$ of the accelerator pedal, while the engine speed signal generator 52 generates an engine speed signal $S_2$ which is a direct current having a voltage corresponding to the engine speed. These signals $S_1$, $S_2$ are both inputted to the operational amplifier circuit 53. Said operational amplifier circuit 53 is characterized by producing direct current outputs with voltages inversely proportional to the engine speed N, each of which voltages is different according to optional amounts of operation $\theta_1$, $\theta_2$ and $\theta_3$, as shown in FIG. 3. Said DC outputs are high in strength enough to cause actuation of the electromagnetic actuator and are applied to the electromagnetic coil 23 as signal $S_3$. The position detecting coil 55 is adapted to have its inductance varied in response to the displacement of the plunger 22 in the axial direction thereof. The coil 55 is connected with an oscillation coil of the generator circuit of the detected position signal generator 56 for varying its oscillation frequency in response to the displacement of the plunger 22 to generate on the basis of the oscillation frequency thus varied a plunger position signal $S_4$ which is a direct current voltage corresponding to the position of the plunger 22. Said signal $S_4$ is inputted to the operational amplifier circuit 53.

Next, the operation of the governor according to the invention constructed as above will be described hereinbelow.

At low engine speeds, as shown in FIG. 1, the flyweights 35 open to such a small extent that the spring seat 33 is kept from leftwardly moving, by the force of spring 14. Thus, the lever 20 is in a position shown in FIG. 1 with the push rod 32 biased leftward so as to have one end thereof spaced from the associated lower end of the connecting lever 10. While the engine is driven under a constant load, the accelerator signal $S_1$, engine speed signal $S_2$, and detected position signal $S_4$ take respective constant values so that a control signal $S_3$ having a predetermined value given by the operational amplifier circuit 53 is applied to the electromagnetic coil 23. Thus, the plunger 22 is kept at a position corresponding to said value of the control signal $S_3$ by the force of coil 23 which rightwardly urges the plunger 22 against the force of spring 2. A rightward displacement of the plunger 22 causes the cylindrical piece 29 to rightwardly move via the rod 26, which in turn causes the fuel control rack 39 to move in the rightward or fuel supply-increasing direction. The electromagnetic force of the coil 23 which is proportional to the direct current voltage from the operational amplifier circuit 53 varies in an inverse proportion to the engine speed as shown in FIG. 3. This electromagnetic force actuates the plunger 22 to move in the rightward direction as viewed in FIG. 1 to force the adaptation spring 28 accommodated in the cylindrical piece 29 to become contracted, thus urging the engaging piece 41 against the upper end of the connecting lever 10. The position of the connecting lever 10 is delimited by the pin 8 of the stopping lever 7 which is adjustably fixed, to determine the maximum rate of fuel supply.

In such balanced state, if the load applied to the engine increases for some reason, the engine speed decreases so that as evident from FIG. 3, the level of the control signal $S_3$ is elevated to increase the electromagnetic force of the coil 23. Thus, the increased electromagnetic force causes a rightward displacement of the plunger 22 so that the rate of fuel supply is increased, thus preventing a decrease in the engine speed. During said displacement of plunger 22, the distance between the plunger 22 and the conical hole 24 of the end wall plate 5 forming the magnetic pole becomes smaller. However, since the end portion 25 of the plunger 22 is tapered, the change in the intensity of the magnetic field between the plunger end portion 25 and the conical hole 24 which is due to the displacement of the plunger 22 is very small. Thus, the plunger 22 is moved by an amount just proportional to a change in the intensity of the magnetic field due to a change in the level of the control signal $S_3$. In other words, an increase in the magnetic attraction applied to the plunger 22 is almost all due to a change in the level of the control signal $S_3$. Thus, the position of the plunger 22 can be controlled over a wide range substantially exactly in accordance with the change in the level of the control signal $S_3$. A change in the position of the plunger 22 also causes a change in the inductance of the position detecting coil 55 which leads to a change in the level of the detected position signal $S_4$ applied to the operation amplifier circuit 53. This detected position signal $S_4$ is inputted to the operational amplifier circuit 53 as a negative feedback signal for controlling the output signal $S_3$ of the same circuit 53. Thus, when the engine undergoes an increased load, the control signal $S_3$ has its level increased until the engine speed increases up to a required level in such a manner that the rate of fuel supply is increased by an amount appropriate for the position then assumed by the plunger 22 or the rate of fuel supply then being effected and the amount of increase in the load. When the engine has reached a required speed, the governor is kept in the position it then assumes, from that time on. On the contrary, if the load applied to the engine decreases and accordingly the engine speed increases, the control signal $S_3$ has its level lowered until the engine speed decreases down to a required level, in response to the rate of fuel supply then being effected and the amount of decrease in the load. Thus, the engine speed is kept at the level thus decreased.

Figure 4:
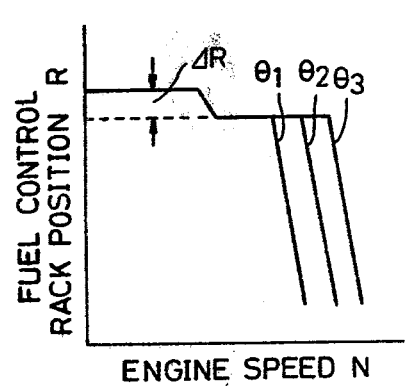
FIG. 4 is a diagram showing the relationship between the position of the fuel control rack and the engine speed in the governor of the invention.

At low engine speeds, the adaptation spring 28 is urged against the connecting lever 10 by the force of the plunger 22 in a fully contracted state. Although the engaging piece 41 is thus kept at a fixed position by the connecting lever 10, fuel is supplied to the engine at such an increased rate as just can compensate for the stroke of contraction of the adaptation spring. The increase rate is equivalent to $\Delta R$ shown in FIG. 4 which plots the relationship between the fuel control rack position R and the engine speed N.

At middle engine speeds, e.g., if the amount of operation of the accelerator pedal is $\theta_2$, the control signal $S_3$ from the operational amplifier circuit 53 increases so that the voltage V applied to the electromagnetic coil 23 varies along the line $\theta = \theta_2$ as seen in FIG. 3. As the engine speed increases, the voltage V applied to the electromagnetic coil 23, i.e., the magnetic attraction applied to the plunger 22 becomes smaller so as to move the plunger 22 in the fuel supply-decreasing direction. Then, the adaptation spring 28 becomes released. If the magnetic attraction acting upon the plunger 22 is further decreased, the plunger 22 is pulled back by the force of adaptation spring 28 so that the pin 30 comes into engagement with the left end of the through hole 42 of the engaging piece 41.

By virtue of the action of said adaptation spring 28, the balance can be obtained between a reduction in the efficiency of air intake by the engine and an increase in the fuel injection rate of the fuel-injection pump in response to an increase in the engine speed, thus achieving complete combustion. The spring 28 is designed to have a larger spring constant and a smaller set load than the spring 2 so that the spring 28 has its operation finished before the engine reaches the high-speed range. When the engine is operated at the high-speed range, the amount of operation of the accelerator pedal takes a value as represented by $\theta_3$ and the voltage V applied to the electromagnetic coil 23, that is, the electromagnetic force varies along a line as represented by the line $\theta = \theta_3$ of FIG. 3. At this time, the spring 28 is in a fully extended state, and accordingly the pin 30 is in engagement with the left end of the through hole 42 so that the engaging piece 41 is spaced from the connecting lever 10.

In the high engine speed range, the plunger 22 and the fuel control rack 39 move integrally with each other with the spring 28 kept in a fully extended state. As the engine speed increases, the flyweights 35 gradually open to cause the sleeve 30 and the spring seat 33 to leftwardly move, which in turn causes the connecting lever 20 to pivot clockwise about the fulcrum shaft 19 so as to have its upper end urge the push rod 32. Then, said push rod 32 comes into contact with and urges the lower end of the connecting lever 10 which in turn has its upper end urge the fuel control rack 39 through the engaging piece 41 to move it leftwardly or in the fuel supply-decreasing direction. On the other hand, when the engine speed decreases, the flyweights 35 droop so that the push rod 32 returns to its leftward position, followed by clockwise pivoting of the connecting lever 10 by the force of the spring wound round the fulcrum shaft 9. Then, the fuel control rack 39 is moved in the rightward direction in FIG. 1 by the force of plunger 22 to increase the rate of fuel supply. During this movement of rack 39, the engaging piece 41 follows the rack 39 together with the top end of connecting lever 10 which urges the engaging piece 41, thus regulating the movement of the rack 39. In this manner, the rate of fuel supply is increased or decreased so as to cancel variations in the engine speed, so that the engine speed is maintained at a prescribed value corresponding to the amount of operation of the accelerator pedal.

Even when used in an engine which is provided with an exhaust gas purification measures such as the exhaust gas recycle system (EGR), the governor according to this invention is capable of quickly adjusting the rate of fuel supply to a proper value, i.e., a value appropriate to the amount of suction air required by the engine, in response to a change in the engine speed when the engine is operated at a low speed or a middle speed, thus achieving excellent accelerability and decelerability of the engine. When the engine is operated at a high speed, stable performance is available with the governor by virtue of the centrifugal force of the flyweights thereof.

It is to be understood that the foregoing description relates to a preferred embodiment of the invention and that various changes and modifications may be made in the invention without departing from the spirit and scope thereof.

What is claimed is:

1. A governor system for a diesel engine, the engine having an accelerator and a fuel-injection pump which has a fuel control rack, the governor system comprising:
    a centrifugal governing means for an upper speed range of the engine, said centrifugal governing means having flyweights displaceable as a function of engine r.p.m. and a shifter movable in response to a displacement of the flyweights;
    an electronic governing means for a lower speed range of the engine, comprising an electromagnetic actuator including an electromagnetic coil, a plunger displaceable in response to the magnetic force of said coil and having a tapered end, a magnetic pole member having an aperture of a conical section corresponding to said tapered end of said plunger for passing said plunger therethrough, and means for permanently urging said plunger in a direction opposite to said magnetic pole member against the magnetic force of said coil; and an electronic control circuit means for driving said electromagnetic actuator, comprising means for generating signals individually representing an amount of operation of said accelerator provided in the engine, an engine speed and a position of said plunger, and an amplifier coupled to said signal generating means for supplying a control signal based upon said generated signals to said electromagnetic coil to actuate the same; a first coupling means permanently coupling said plunger with said fuel control rack of said fuel-injection pump; and
    a second coupling means adapted to connect said shifter of said centrifugal governing means with said control rack to transmit a displacement of said flyweights thereto when the engine speed has exceeded a predetermined speed in said upper speed range of the engine, and to keep said shifter disengaged from said control rack below said predetermined speed.

2. The governor as claimed in claim 1, wherein said first coupling means comprises: at least one coupling element mounted on an end of said plunger; a hollow cylindrical member carried by said coupling element with an open end thereof directed in a direction opposite to said plunger; an engaging member slidably inserted in said hollow cylindrical member through said open end and coupled with said fuel control rack; and an adaptation spring interposed between said hollow cylindrical member and said engaging member for urging said engaging member outwardly of the open end of said hollow cylindrical member.

3. The governor as claimed in claim 2, wherein said engaging member has an elongate through hole laterally extending therethrough, and said cylindrical member has a pin fixed thereto and slideably inserted in said through hole.

4. The governor as claimed in claim 2, wherein said second coupling means is adapted for urging contact with said engaging member to displace said fuel control rack via said engaging member in a fuel supply-decreasing direction, when said predetermined speed is exceeded.

5. The governor as claimed in claim 1, wherein said second coupling means comprises: a first connecting lever having an end thereof engaging with said shifter for pivoting about a substantially central fulcrum thereof in response to an opening motion of said flyweights; a push rod having an end thereof arranged in urging contact with an opposite end of said first connecting lever for making an axial movement in response to a pivotal motion of said first connecting lever; and a second connecting lever provided for making a pivotal motion about a substantially central fulcrum thereof, said second connecting lever having an end thereof arranged opposite to an opposite end of said push rod and an opposite end thereof arranged for urging contact with a face of an end of said first coupling means which is coupled with said fuel control rack, whereby said opposite end of said second connecting lever is adapted to urge said end face of said first coupling means when said predetermined speed is exceeded.

6. The governor as claimed in claim 5, further comprising a stopping lever having one end thereof concentric with said second connecting lever for limiting the range of pivotal motion of said second connecting lever in one direction to prevent a further movement of said fuel control rack in a fuel supply-increasing direction, in excess of a prescribed position.

7. The governor as claimed in claim 6, wherein said stopping lever has a stopper thereon, and further comprising means for permanently urging said second connecting lever against said stopper on said stopping lever, whereby said stopping lever is displaceable to determine said predetermined speed.

8. The governor as claimed in claim 1, wherein said magnetic pole member is interposed between said plunger and said first coupling means, said plunger being adapted to be displaced toward said fuel control rack to move it in a fuel supply-increasing direction against the force of said permanent urging means, by the magnetic force of said electromagnetic coil which is supplied with said control signal having a voltage inversely proportional to the engine speed.

* * * * *